(12) United States Patent
Blees et al.

(10) Patent No.: US 10,639,130 B2
(45) Date of Patent: May 5, 2020

(54) MOCKUP REPRESENTING A DENTAL ARCH INCLUDING ANALOGS APPROXIMATING ORTHODONTIC BRACKETS AND METHOD OF MAKING THE MOCKUP

(71) Applicant: 3M INNOVATIVE PROPERTIES COMPANY, St. Paul, MN (US)

(72) Inventors: Dietmar Blees, Löhne (DE); Ralf M. Paehl, Melle (DE); Ralf Schlimper, Melle (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 812 days.

(21) Appl. No.: 14/651,440

(22) PCT Filed: Dec. 4, 2013

(86) PCT No.: PCT/US2013/073041
§ 371 (c)(1),
(2) Date: Jun. 11, 2015

(87) PCT Pub. No.: WO2014/093084
PCT Pub. Date: Jun. 19, 2014

(65) Prior Publication Data
US 2015/0313687 A1    Nov. 5, 2015

(30) Foreign Application Priority Data
Dec. 11, 2012    (EP) .................... 12196586

(51) Int. Cl.
*A61C 7/14*    (2006.01)
*A61C 7/00*    (2006.01)
(Continued)

(52) U.S. Cl.
CPC .............. *A61C 7/002* (2013.01); *A61C 7/146* (2013.01); *A61C 7/145* (2013.01);
(Continued)

(58) Field of Classification Search
CPC .. A61C 7/002; A61C 7/12; A61C 7/14; A61C 7/145; A61C 7/146; A61C 13/0013; A61C 13/0019
See application file for complete search history.

(56) References Cited

U.S. PATENT DOCUMENTS 4,160,322 A    7/1979    Frazier
4,551,096 A    11/1985    Dellinger
(Continued)

FOREIGN PATENT DOCUMENTS

EP    0502227    9/1992
JP    2010-227607    10/2010
(Continued)

OTHER PUBLICATIONS

International Search Report for PCT International Application No. PCT/US2013/073041 dated Mar. 4, 2014, 5 pages.

*Primary Examiner* — Ryan M Ochylski

(57) ABSTRACT

A method of making a physical mockup the method comprises the steps of providing a virtual dental arch, a virtual set of orthodontic brackets for the virtual dental arch and a virtual set of analogs. Each analog is associated with a virtual bracket of the virtual set of brackets and the shape of at least one of the analogs differs from the shape of the associated bracket. The method further comprises the steps of providing a virtual mockup in which the virtual dental arch and the set of virtual analogs are merged, and manufacturing the physical mockup based on the virtual mockup. The physical mockup represents a shape composed of the shape the dental arch and the shape of the set of analogs. The invention facilitates bonding of brackets to a patent's teeth.

10 Claims, 6 Drawing Sheets

(51) Int. Cl.
 *B33Y 10/00* (2015.01)
 *B33Y 80/00* (2015.01)
 *A61C 13/00* (2006.01)

(52) U.S. Cl.
 CPC ...... *A61C 13/0013* (2013.01); *A61C 13/0019* (2013.01); *B33Y 10/00* (2014.12); *B33Y 80/00* (2014.12)

(56) References Cited

U.S. PATENT DOCUMENTS

| | | |
|---|---|---|
| 5,011,405 A | 4/1991 | Lemchen |
| RE35,169 E | 3/1996 | Lemchen et al. |
| 5,683,243 A | 11/1997 | Andreiko et al. |
| 5,863,198 A | 1/1999 | Doyle |
| 5,879,158 A | 3/1999 | Doyle et al. |
| 5,971,754 A | 10/1999 | Sondhi et al. |
| 6,905,337 B1 | 6/2005 | Sachdeva |
| 7,020,963 B2 | 4/2006 | Cleary |
| 7,168,950 B2 | 1/2007 | Cinader, Jr. et al. |
| 7,811,087 B2 | 10/2010 | Wiechmann |
| 8,562,339 B2 | 10/2013 | Raby et al. |
| 2006/0257821 A1 | 11/2006 | Cinader, Jr. |
| 2007/0087302 A1 | 4/2007 | Reising |
| 2010/0159413 A1 | 6/2010 | Kuo |
| 2014/0178828 A1* | 6/2014 | Jo .......... A61C 7/002 433/3 |

FOREIGN PATENT DOCUMENTS

| | | |
|---|---|---|
| JP | 2012-136247 | 7/2012 |
| JP | 2012-179370 | 9/2012 |
| WO | WO 2000-19931 | 4/2000 |
| WO | WO 2000-32132 | 6/2000 |
| WO | WO 2000-36989 | 6/2000 |
| WO | WO 2001-80761 | 11/2001 |
| WO | WO 2009/103887 | 8/2009 |
| WO | WO 2012-136247 | 10/2012 |

* cited by examiner

MOCKUP REPRESENTING A DENTAL ARCH INCLUDING ANALOGS APPROXIMATING ORTHODONTIC BRACKETS AND METHOD OF MAKING THE MOCKUP

CROSS REFERENCE TO RELATED APPLICATIONS

This application is a national stage filing under 35 U.S.C. 371 of PCT/US2013/073041, filed Dec. 4, 2013, which claims priority to EP Application No. 12196586.7, filed Dec. 11, 2012, the disclosure of which is incorporated by reference in its/their entirety herein.

FIELD OF THE INVENTION

The invention relates to a method of making a physical mockup which represents a shape composed of the shape of a patient's dental arch and the shape of a set of analogs. The analogs approximate or replicate the shape of orthodontic brackets. The physical mockup particularly represents a precise position of the brackets and facilitates manufacturing of a transfer tray for the brackets.

BACKGROUND ART

Orthodontic brackets are used in orthodontic treatments for moving one or more teeth from an initial position (sometimes referred to as malposition or malocclusion) to a desired position in a patient's dentition. For example by an orthodontic treatment the patient's teeth may be moved such that their labial sides are aligned with each other to achieve or maximize an aesthetically pleasant appearance of the overall dentition. Further in some cases one or more teeth may be moved to correct a malocclusion. The movement of teeth is typically achieved by a pre-biased elastic archwire which is attached via brackets to the teeth, and which applies a force to the teeth toward the desired position over a longer time period.

The brackets are typically bonded to the patient's teeth and the elastic archwire is connected to the brackets. The archwire is typically shaped to match with the position of the brackets in the desired position of the teeth so that in the initial position of the teeth the archwire can be connected to the brackets only under pretension. Accordingly the archwire once it is installed to the brackets is elastically deformed or pre-biased in the initial position of the teeth and the reset force toward the non-deformed shape of the archwire causes the teeth to be urged toward the desired position.

So-called treatment planning systems have been used to determine the desired position of the teeth in a computer simulation in advance of any actual treatment. Such a planning system helps for example for avoiding collisions between the teeth and brackets in tooth positions outside the initial position, and further allows for the brackets and the archwire to be designed and arranged to match with a variety of clinical situations, for example with the position of the teeth in the initial position, in the desired position, and positions between. In particular for lingual brackets such treatment planning is widely used. Lingual brackets often have a customized design individually for every tooth and patient because, other than the labial surfaces of a tooth, the lingual surfaces greatly vary in shape relative to each other so that a "one fits all" bracket shape typically cannot be used. Some treatment planning systems also allow for designing such customized brackets which precisely match a tooth surface and the required clinical situations of a patient. Accordingly customized brackets typically have to be precisely placed at positions on the teeth which are predetermined during the treatment planning. For facilitating a precise placement of the brackets on a patient's teeth and for the orthodontist's reference, the brackets are often provided prepositioned on a plaster model replicating the patient's teeth.

Such a plaster model on which the brackets are placed is sometimes used in orthodontics to make a so-called transfer tray for facilitating the placement of the bracket on a patient's teeth. A transfer tray typically is adapted to hold a complete set of brackets at the predetermined position and allow the brackets to be placed and bonded on the teeth in one step.

For example U.S. Pat. No. 7,020,963 discloses an indirect bonding apparatus is made by initially placing spacer material over a replica of the patient's tooth structure. A tray is then formed over the spacer material and hardened. Next, the spacer material is removed from the tooth replica and orthodontic appliances are placed on the replica at desired locations. A matrix material is placed between the tray and the replica and allowed to harden. The tray and the brackets (which are embedded in an interior wall of the tray) are then detached from the plaster model.

In another example as disclosed in WO 01/80761 a treatment planning software virtually superimposes brackets on teeth to generate a three-dimensional model comprising the three-dimensional tooth objects plus the virtual brackets at their intended locations. This three-dimensional model is supplied to a stereo lithography (SLA) instrument for manufacturing a plastic model of the teeth with the brackets superimposed thereon. A thermoplastic foil is placed above the SLA model and the model and foil are placed within a pressure chamber. The chamber is pressurized so that the foil envelops the dentition and the brackets. The foil thus obtains small indentations where the brackets can be located.

Although a variety of different solutions for precise positioning of brackets are available there is still a desire to provide a solution which helps maximizing the precision of the positioning and minimizing costs in the orthodontic treatment.

SUMMARY OF THE INVENTION

The invention in one aspect is directed to a method of making a physical mockup as defined in claim 1. The physical mockup represents a shape composed of the positive shape of a patient's dental arch and the positive shape of a set of analogs. The positive shape of a patient's dental arch and the positive shape of a set of analogs preferably superimpose additively, for example without overlap and positioned directly adjacent. The shape of the dental arch and the set of analogs preferably together form one contiguous piece, for example may not be assembled from prefinished analogs, on the one hand, and a prefinished dental arch, on the other hand.

The method comprises the steps of:
providing a virtual dental arch replicating at least part of the patient's dental arch;
providing a virtual set of orthodontic brackets for the virtual dental arch;
providing a virtual set of analogs, each analog being associated with a virtual bracket of the virtual set of brackets, wherein one or more of the virtual analogs approximate the shapes of their associated virtual brackets;

wherein the shapes of said one or more of the analogs each differ from the shapes of their associated brackets;

providing a virtual mockup in which the virtual dental arch and the set of virtual analogs are merged; and manufacturing the physical mockup based on the virtual mockup.

The invention may be advantageous in the preparation of a transfer tray for brackets. In particular the invention preferably allows for providing a transfer tray in which brackets can be removably placed and positioned without substantially damaging the transfer tray. The invention is also advantageous in that brackets are preferably easily placeable into the tray. In particular a user placing a bracket in the tray may recognize a sensible "snap-in" feedback as soon as the bracket is placed in the appropriate position. Further a transfer tray prepared by use of the invention preferably allows precise positioning of the brackets but removal of the brackets at relatively low forces. Hence such a tray after use for bonding brackets in a patient's mouth may be easily removed whereby the risk of breaking off (debonding) the brackets may be minimized. Further a physical mockup as obtainable by the method of the invention typically allows for making a transfer tray by the dental practitioner or orthodontist. Therefore there may not be a need to obtain a transfer tray from a dental lab. This enables for example a remaking of a tray, or a partial tray, in case of a bracket breaks of a patient's tooth. Further the invention allows for providing a physical mockup in which the position of the brackets relative to the dental arch is provided without manual assembly tolerances. Hence a transfer tray replicated from the mockup preferably is adapted to precisely position the brackets relative to a patient's teeth. The invention is particularly advantageous in that it enables a "digital workflow" between an orthodontist and a bracket manufacturer for preparation of the brackets and the transfer tray. In particular the orthodontist may not need to send a physical plaster model of the patient's malpositioned teeth to the bracket manufacturer. Further the preparation of the physical mockup may help minimizing the time for preparation because an assembly step for manually placing the analogs or the brackets to a physical model of the dental arch is not needed.

For the purpose of this specification the term "virtual" refers to a three-dimensional computer representation of an object, preferably based on a mathematical representation of a three-dimensional shape in data form and processible by a computer. Such virtual objects in the form of data including their visualizations (for example wire frames or digital renderings) are widely known in the field of Computer Aided Design (CAD).

For the purpose of the present specification the term "set of" refers to a "plurality of". In an embodiment one or more of the set of virtual analogs represent the shape of the associated virtual bracket, whereas the remaining virtual analogs of the same set of virtual analogs only approximate the shape of the associated virtual bracket. In this embodiment the shape of an analog representing the shape of the associated virtual bracket preferably substantially exactly correspond in shape to the shape of the respective associated virtual bracket. The term "substantially exactly" in this regard means that the shapes are exactly identical except for the eventual presence of tolerances that may result from making the analogs. Further in this embodiment the shape of an analog approximating the shape of the associated virtual bracket preferably differs in shape from the shape of the respective associated virtual bracket. Preferably the shape of an analog approximating the shape of the associated virtual bracket extends over boundaries of the shape of the associated virtual bracket.

In one embodiment the method comprises capturing a shape of a patient's dental arch and thereby providing the virtual dental arch. The shape of a patient's dental arch may be captured by intra-orally scanning at least part of the patient's dentition including the teeth, or by scanning a physical model, for example a plaster model, of the patient's teeth. Scanning devices which allow for providing a virtual dental arch in data form are for example available under the designation Lava™ Scan ST and Lava™ Chairside Oral Scanner C.O.S, both from 3M Deutschland GmbH.

In one embodiment the method further comprises the step of positioning the virtual brackets relative to the virtual dental arch. There are treatment planning systems which allow for designing and/or placing virtual brackets relative to a virtual dental arch by computer aid. Such a system is for example described in U.S. Pat. No. 7,811,087. The virtual brackets may be at least partially designed and/or retrieved from a database. Each bracket may be automatically and/or manually positioned relative to a virtual tooth comprised in the virtual dental arch.

In a further embodiment the method comprises the step of modifying the shape of at least one virtual bracket to form at least one of the virtual analogs. Such modification is preferably performed by computer aid, for example by use of a CAD technique. Accordingly the person skilled in the art will recognize various possibilities for modifying a shape, for example by change of an existing shape, adding or removing a shape, virtually copying, cutting, extending, reducing or another suitable technique. The original shape of any modified virtual bracket is preferably stored in the computer. Thus the original virtual bracket may be available for manufacturing a physical bracket.

The set of analogs may be provided by assuming the changed and unchanged virtual brackets to form the set of analogs, by providing a virtual copy of any changed bracket and assuming any unchanged virtual bracket as analog, or providing a virtual copy of the changed and unchanged virtual brackets to create the analogs. The skilled person will be able to create the set of analogs in any suitable manner, for example by functions available on a CAD system, to provide a set of analogs in which the shape of at least one of the analogs differs from the shape of the associated bracket.

In one embodiment the modification step comprises increasing a three-dimensional volume represented by the virtual bracket by selectively modifying only a portion of the bracket. For example the modification step may comprise a flattening or reduction of an indentation present in the bracket shape. The modification step may further comprise at least partially filling a space between portions of the bracket shape, or adding a virtual structure to the bracket shape. Thus undercuts which may hinder in the placement of the brackets into the tray or eventually retain a transfer tray from being removed may be minimized. Further the modification step may comprise optionally reducing the three-dimensional volume by selectively modifying another portion of the bracket. For example the modification step may comprise a rounding of an edge to account for abrasion of a physical bracket during a surface treatment step (for example during deflashing or polishing). Further the modification step may comprise maintaining or substantially of at least a portion of the original virtual bracket shape. Thus the shape of each virtual analog may substantially correspond at least partially to the shape of one virtual bracket of the virtual set of brackets.

In one embodiment the physical mockup is manufactured by additive manufacturing, for example a rapid prototyping or build-up technique. Such additive manufacturing is sometimes also referred to as Stereolithography (SLA) or 3D-printing.

In a further embodiment the method comprises the step of providing a transfer tray for the set of brackets. The transfer tray is preferably provided through physically replicating the negative shape of at least part of the physical mockup. The step of providing the transfer tray may comprise providing of a hardenable liquid or pasty material, for example a curable material. Suitable materials may be selected from among.

Preferably the hardenable material is transparent or substantially transparent at least when hardened.

In an embodiment the method comprises the steps of:
  providing an elastic sheeting on the physical mockup to cover at least part of the tooth side of the mockup by the sheeting;
  providing a plastic sheeting on the mockup with the elastic sheeting arranged between the plastic sheeting and the mockup;
  deforming the plastic sheeting over the mockup such that it tightly encloses at least the tooth side of the mockup with the elastic sheeting embraced between the plastic sheeting and the mockup;
  replacing the elastic sheeting by a hardenable liquid or pasty material; and
  allowing the hardenable material to harden.

In a particular aspect the invention is directed to a method of making a transfer tray, comprising the steps of:
  providing a physical mockup in a shape that resembles or corresponds to a positive shape of a patient's dental arch which is furnished with a set of brackets;
  providing an elastic sheeting on the physical mockup to cover at least part of the tooth side of the mockup by the sheeting;
  providing a plastic sheeting on the mockup with the elastic sheeting arranged between the plastic sheeting and the mockup;
  deforming the plastic sheeting over the mockup such that it tightly encloses at least the tooth side of the mockup and such that it embraces the elastic sheeting between the plastic sheeting and the mockup;
  replacing the elastic sheeting by a hardenable liquid or pasty material; and
  allowing the hardenable material to harden.

The elastic sheeting may be made of a material selected from among dental impression materials, preferably having a Shore A hardness of about 20 after hardening, and may have a thickness within a range of about 2 to about 5 mm. The elastic sheeting preferably has a size (or area) that is suitable to embrace the at least part of the labial sides, the occlusal sides and at least part of the lingual sides of the teeth represented in the physical mockup. Further the elastic sheeting may be sized to embrace the whole physical mockup or multiple physical mockups. Thus the elastic sheeting may have a U-shape along a path which approximately corresponds to the path along which the occlusal sides of the teeth in the mockup are arranged. Alternatively the elastic sheeting may be sized to overall cover at least a footprint of one or more physical mockups in a plane approximately parallel to the occlusal sides of the teeth in the mockup.

The plastic sheeting (or plastically, for example thermoplastically, deformable sheeting) may for example be made of Duran® available from Scheu Dental, Germany, and may have a thickness within a range of about 0.5 to about 1.5 mm. The plastic sheeting may have a size (or area) corresponding to the size of the elastic sheeting, but preferably has a larger size.

The plastic sheeting is preferably deformed by gas pressure, for example by applying a pressure or vacuum on only one side of the sheeting to cause a pressure difference relative to the other side and thus causing the sheeting to deform over the mockup. The plastic sheeting may be heated before and/or during the deformation process to soften the material the plastic sheeting is made of. Such a so-called thermoforming may be performed using a thermoforming device, for example as available under the designation 508DT from the company Formech Inc., Chicago, Ill., USA.

Preferably the plastic sheeting is deformed such that it together with the elastic sheeting tightly embraces the teeth represented in the mockup. Thereby the elastic sheeting preferably acts as a space layer causing the plastic sheeting to form around the teeth at a certain distance determined by the thickness of the elastic sheeting.

For replacing the elastic sheeting by a hardenable liquid or pasty material the plastic sheeting, if thermoformed, is preferably allowed to cool. Thereby the plastic sheeting preferably obtains a sufficient stiffness for handling. The plastic sheeting and the elastic sheeting may be removed from the physical mockup, and the elastic sheeting may be removed from the plastic sheeting. The plastic sheeting, after deformation, may have a generally trough-shaped indentation which approximates a three-dimensionally proportionally enlarged shape of the teeth (including the analogs) represented in the physical mockup. The indentation may be filled with the hardenable material which may be selected from among Kanisil® and Odontosil™. The mockup may be mated with the deformed plastic sheeting so as to enclose the hardenable material between the mockup and the sheeting. The amount of the hardenable material is preferably selected such that during mating of the mockup and the sheeting the hardenable material flows around (preferably to embed relevant parts of) the teeth and analogs represented in the mockup. To minimize voids or bubbles between the teeth and the hardenable material the mated mockup, hardenable material and sheeting may be exposed to a vacuum or pressure, for example by use of an autoclave or pressure chamber. The hardenable material may subsequently be allowed to harden or may be cured. The hardened flowable material is preferably elastic and has a shore hardness of between about 50 shore A and 70 shore A, preferably about 60 Shore A. Preferably the hardened flowable material and the deformed sheeting in combination form the transfer tray.

The mockup and the transfer tray in a situation mated with each other preferably define one or more a reference axes along a direction in which the transfer tray is at least partially removable from the mockup. Different sections (for example a section of one tooth) of the mockup and the transfer tray may define different (or slightly different reference axes) however in the following it is referred to one reference axis only for the sake of simplicity. The modification of the shape of one or more of the brackets preferably comprises a reduction or elimination of an undercut formed by at least one of the brackets and suitable to lock or retain the transfer tray against a movement along the reference axis. In other words relative to a bracket shape the associated analog shape may provide a lower retention of the transfer tray mated on the physical mockup.

In one embodiment the transfer tray replicates the negative shape of only part of the physical mockup, for example the shape of only one analog and the shape of at least part of a tooth in the dental arch. A partial transfer tray may for example allow for rebonding or replacing a bracket in a patient's mouth. The mockup may be adapted such that the transfer tray obtains one or more separation markers at predetermined positions. A user of the transfer tray may separate (for example cut) the tray at a separation marker and thus obtain a partial transfer tray. The mockup may therefore be provided such that it comprises one or more bulges or ridges which replicate corresponding recesses or notches in the tray. Instead or in addition to a separation marker a position marker may be provided on the mockup in the form of a raised or recessed structure, such as for example a position marker indicating the center of a tooth. Further the mockup may be provided such that it comprises raised or recessed numbers which indicate the tooth number and/or the quadrant number. In a further embodiment the method comprises the step of placing one or more brackets in respective one or more receptacles, wherein each receptacle corresponds to the negative shape of an analog associated with the bracket. This may be performed bracket by bracket manually or by picking up a set of brackets pre-placed on a physical model of the patient's teeth, in that the empty transfer tray (without the brackets) is mated with the physical model of the patient's teeth including the brackets and by separating the transfer tray from the model of the patient's teeth. In the latter step the brackets preferably are retained in the transfer tray and released from the model. This may be achieved by a relatively slight temporary bond between the brackets and the model.

In a further aspect the invention relates to a physical mockup obtained from the method of any of the preceding claims.

In still a further aspect the invention relates to a kit of parts, comprising:
  a set of brackets being adapted to be placed on a patient's dental arch, and
  a physical mockup representing a shape composed of the positive shape of the patient's dental arch and a positive shape of a set of analogs each being associated with the shape of a bracket of the set of brackets, and
  wherein the shapes of one or more of the analogs approximate the shapes of their associated brackets; and
  wherein said one or more of the analogs each have a different shape than their associated brackets.

In one embodiment the kit comprises a transfer tray for placing the set of brackets to the patient's dental arch. Such a transfer tray may be used to ship the brackets from the bracket manufacturer to a dental practitioner or orthodontist, and/or for bonding the brackets to a patient's teeth at a position predetermined by the transfer tray.

In a further embodiment the kit further comprises one or more archwires for assembly with the set of brackets.

DETAILED DESCRIPTION OF THE INVENTION

Figure 1:
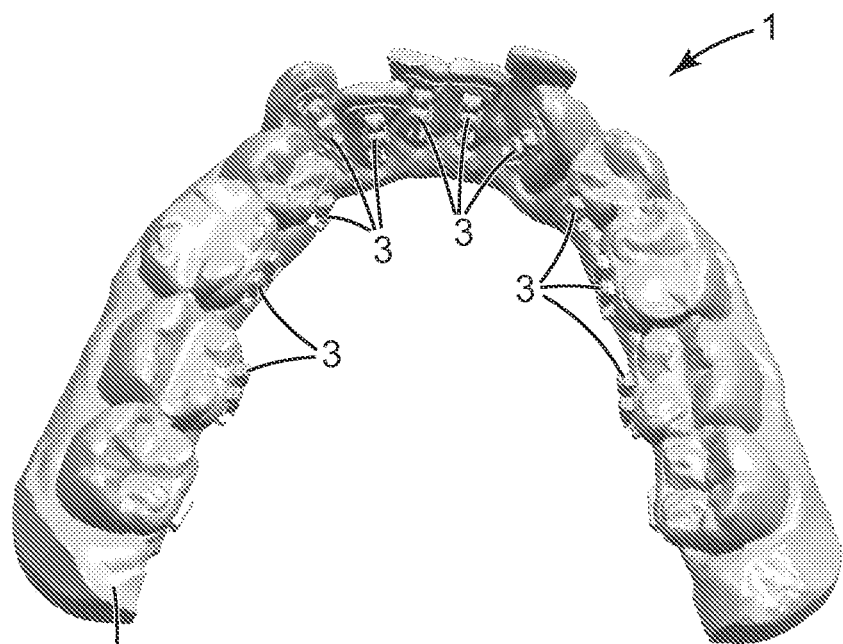
FIG. 1 is a perspective view of a physical mockup according to an embodiment of the invention.
Figure 2:
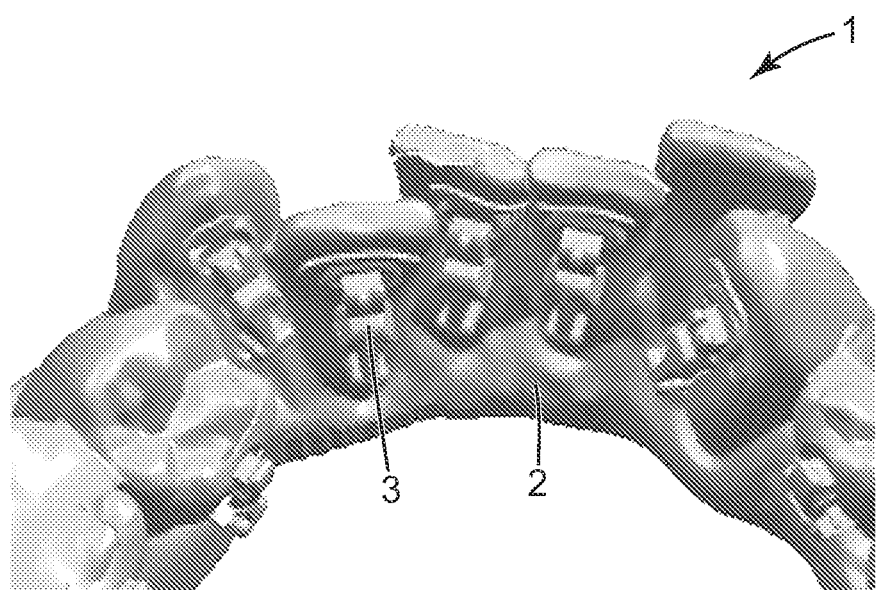
FIG. 2 is a partial enlarged view of FIG. 1.

FIG. 1 shows a physical mockup 1 representing a shape composed of the positive shape of a patient's dental arch 2 and the positive shape of a set of analogs 3 (for the sake of clarity not each of the analogs shown is referenced by a reference line in the Figure). The analogs 3 represent or approximate orthodontic brackets as they are used, in combination with an archwire, to move a patient's teeth from a malposition toward a desired position. In the physical mockup 1 the patient's teeth are represented in the malposition as illustrated in more detail in FIG. 2.

The physical mockup 1 may be used for physically shaping a transfer tray (not shown in this Figure) for bonding brackets at a predetermined position provided by the transfer tray on a patient's teeth. The transfer tray forms a negative replica of at least part of the physical mockup 1. Such a transfer tray may for example be obtained from taking an impression from the physical mockup 1, from overmolding the physical mockup 1 or from another technique in which the positive physical model 1 is used for, preferably directly, shaping a negative replica. The physical model 1 is preferably configured to provide predetermined undercuts which on the one hand allow orthodontic brackets to be retained or secured within the transfer tray but on the other hand facilitates a removal of the transfer tray from the physical mockup 1 or the patient's teeth without destroying the transfer tray or breaking a bracket off the patient's teeth. Because the shape of orthodontic brackets often form undercuts which would hamper or block a nondestructive removal of the transfer tray, the brackets are represented in the physical mockup 1 by analogs 3 which may not form exact replicas of brackets but just approximate the bracket shape to control undercuts toward a desired level. It is however noted that a bracket which matches with the desired level of undercuts may be represented by an analog forming an exact replica of that bracket, whereas a bracket forming an undesired undercut may be represented by an analog having an approximate shape of such bracket. Accordingly a transfer tray replicated from the physical mockup preferably obtains a shape having the level of undercuts allowing for retaining the brackets and for nondestructive removal from the patent's teeth.

The physical mockup 1 in the example is manufactured by additive manufacturing, and thus the dental arch 2 and the analogs 3 are formed in a single piece in the physical mockup 1. The physical mockup 1 may particularly not be obtained by or consist of an assembly of the analogs 3 onto dental arch 2. Accordingly the position of the analogs 3 relative to the dental arch 2 can be determined by computer aid and manual assembly tolerances can be avoided.

The manufacturing of the physical mockup in this example is based on a virtual mockup prepared in a computer system. Such a virtual mockup preferably corresponds to a mathematical representation of a three-dimensional shape which can be processed by a computer, for example by a CAD (Computer Aided Design) system. Further the virtual mockup is preferably available in the form of computer data which can be used to control an additive manufacturing machine for manufacturing the physical mockup at a shape as defined by the virtual mockup. The virtual mockup may be designed or generated from superimposing or merging a virtual dental arch of a patient with a set of virtual analogs as further described in FIG. 3.

Figure 3:
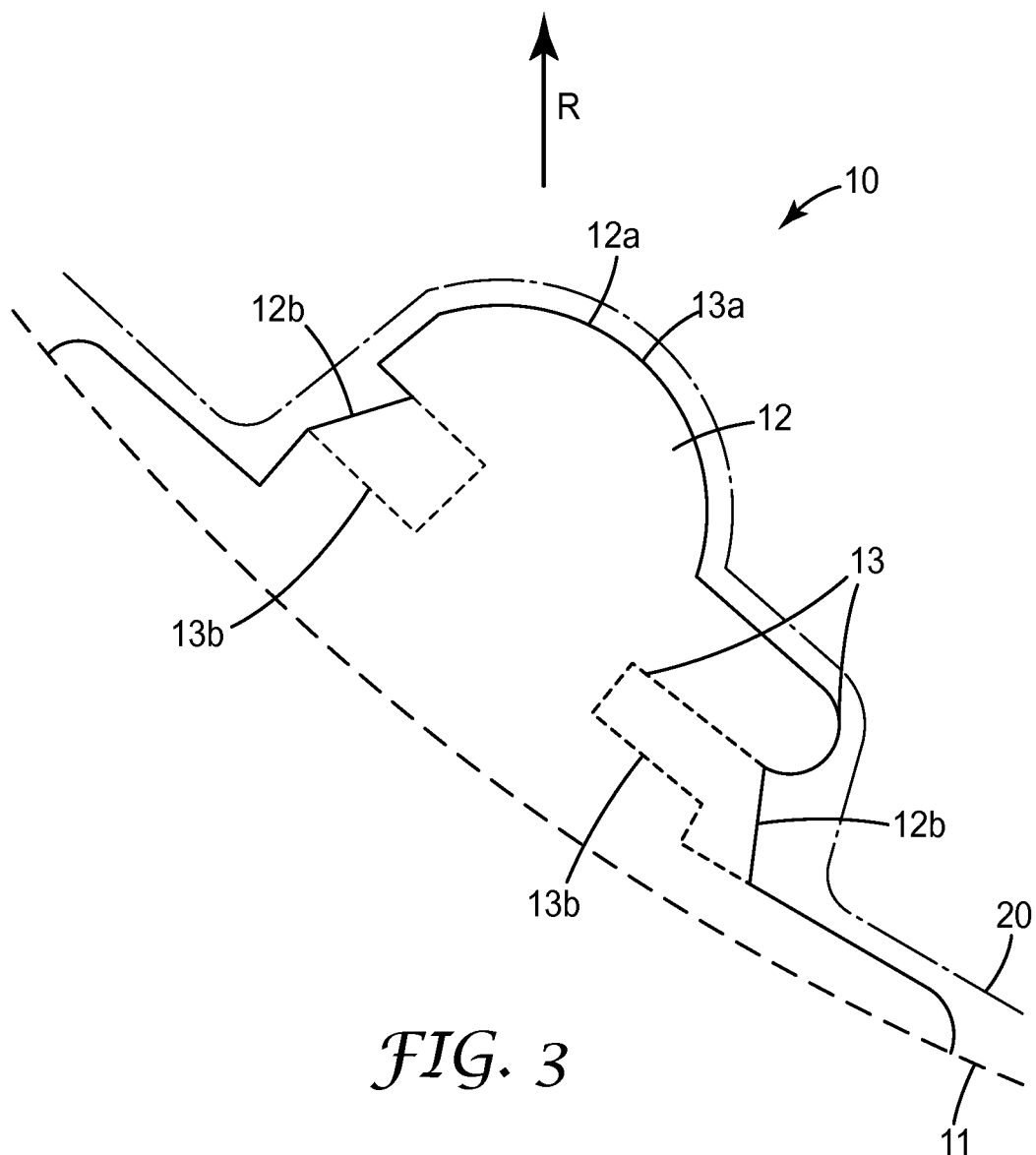
FIG. 3 is a schematic cross-sectional view of a virtual mockup according to an embodiment of the invention.

FIG. 3 shows a cross-section of a virtual mockup 10. The virtual mockup 10 combines the shape of virtual analogs (in this view represented by virtual analog 12) and the shape of a virtual dental arch 11. The virtual analog 12 and the virtual dental arch 11 may be obtained from discrete independent virtual parts, or from providing the dental arch 11 and adding the virtual analog 12 to the dental arch 11 by computer aid, for example by additive design or modification of the dental arch 11. The skilled person will be able to use other techniques as known in the field of Computer Aided Design to provide the virtual mockup 10 and to combine the shapes of the virtual analogs and the virtual dental arch.

In the example the virtual analog 12 is obtained based on (for example by modification of) a virtual bracket 13. In the example it is referred to a lingual bracket which typically is designed and fabricated individually for every tooth and patient. The person skilled in the art will however recognize that although the present invention may provide certain advantages in use with lingual brackets it may likewise be used in combination with labial brackets or a combination of lingual and labial brackets. One possibility of providing a virtual bracket is for example disclosed in U.S. Pat. No. 7,811,087. The bracket design may be performed on a computer that stores a three-dimensional virtual dental arch of a patient. The virtual dental arch may be obtained by scanning the patient's teeth or a physical model of the patent's teeth. Thus the shape of the patient's dental arch, comprising the shape of the teeth and their position relative to each other, can be provided in the form of a computer processible representation. The computer may be equipped with a so-called treatment planning software which allows for moving the teeth in the virtual model to desired finish positions. An important element of the bracket is the pad by which the bracket is bonded to a tooth. The tooth facing pad geometry may be derived directly from tooth geometries represented in the virtual dental arch so that the pad obtains a three-dimensional surface which substantially exactly matches with the corresponding tooth surface. This allows for a relatively precise placement of the bracket on the tooth and helps in maximizing the bonding strength. Another part of the bracket, the bracket body, containing a slot for receiving an archwire and further features that allow fastening the wire into the slot, may be available on the computer as predefined virtual models, for example in the form of a library of bracket bodies. To provide a virtual set of brackets for the virtual dental arch certain predefined virtual bodies may be selected. The bracket bodies are preferably aligned with their slots relative to each other, for example such that a generally U-shaped virtual archwire can run through the slots of all brackets. Once the slot position of the bracket bodies have been determined the bracket bodies and the respective bracket pads may be combined, for example virtually merged to form the set of virtual brackets. Common Computer Aided Design (CAD) programs have capabilities (for example boolean operations) to connect existing shapes to each other. Optionally the design of the virtual brackets, or parts of the brackets, may be adapted to account for a good articulation, hygiene requirements or other aspects as needed.

The virtual brackets are used to provide the set of analogs based thereon. Each analog of the set of analogs is associated with a virtual bracket of the virtual set of brackets. In the example the virtual analog 12 and the virtual bracket 13 are associated and have the same shape at first areas 12a, 13a, however differ in shape at second areas 12b, 13b. In particular the second areas 12b of the virtual analog 12 comprise reduced undercuts relative to undercuts present in the second areas 13b of the virtual bracket 13. In the example the undercuts are structures which would (in a physical mockup) retain an imaginary replica 20 against a separation from the virtual mockup 10 in a direction R. Thereby the reduced undercuts in the second areas 12b of the analogs 12 are dimensioned to provide for a lower retention than the undercuts in the second areas 13b of the brackets 13. Accordingly relative to the shape of the bracket 13 the shape of the analog 12 is adapted to facilitate a removal of a transfer tray which is made based on that analog shape. As mentioned one or more of the virtual analogs may substantially exactly correspond in shape to the shape of the virtual bracket, although in most cases the shape of virtual analogs and the shape of the virtual brackets may differ at least in areas comprising undercuts.

The virtual analogs may be provided by virtually replicating the virtual brackets and eventually redesigning of one or more portions of the replicated virtual bracket shape. The computer may have capabilities to determine a virtual retention strength depending on the undercuts present in one more or all of the analogs. For example substantial and/or a high number of undercuts present in a set of analogs may lead to a relatively high virtual retention strength, whereas less substantial and/or a lower number of undercuts may lead to a lower virtual retention strength. Accordingly the computer may be adapted to display a virtual retention strength and optionally upper and lower limits for a desired virtual retention strength to a user. The user may adjust the undercuts of the analogs accordingly by design. Thus the retention strength of the transfer tray relative to the physical model may be determined during the virtual design which may minimize the need of physically adjusting the physical mockup and/or the transfer tray.

To provide a virtual mockup the virtual dental arch and the set of virtual analogs may be combined, for example merged or superimposed by computer aid. The virtual mockup, which is preferably present in the form of a computer processible three-dimensional data may be transmitted to a additive manufacturing machine which manufactures the physical mockup based on the virtual mockup.

Figure 4:
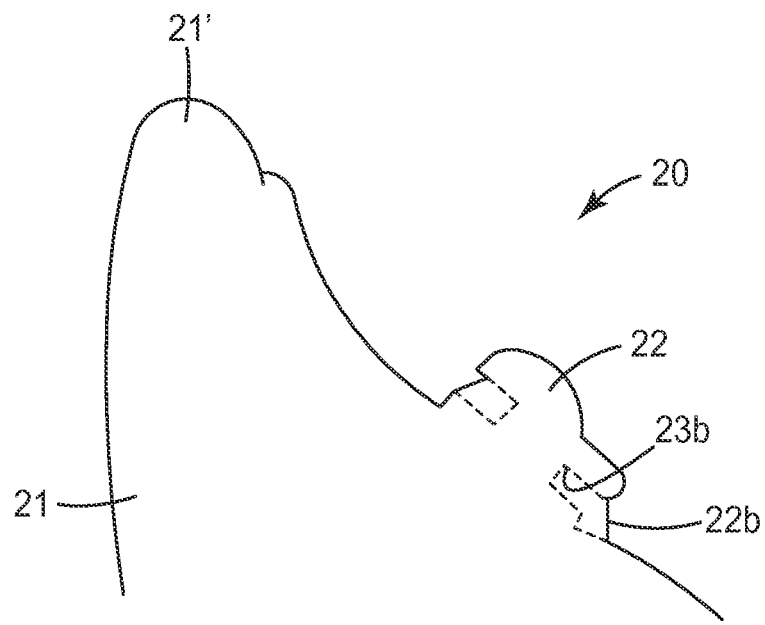
FIGS. 4-11 are schematic cross-sectional views illustrating a method of making a transfer tray according to an embodiment and aspect of the invention.

FIG. 4 shows a physical mockup 20 having a set of analogs which analog 22 is representative of in the Figure. The physical mockup 20 further represents a patient's dental arch 21 which is represented by a tooth 21'. The analog 22 and the tooth 21' are formed in one piece, and particularly are not assembled but formed in a contiguous volume of material. Further although not illustrated in the example the whole set of analogs and the dental arch are formed in one piece. The analog 22 has an undercut area 22b which with respect to an undercut area 23b (illustrated in dotted/dashed lines) of an imaginary associated bracket is reduced. It is noted that the physical mockup 20 actually does not include the brackets, and a part of a bracket is only provided in the Figure for illustration of the geometric difference between the analog 22 and the associated bracket.

The physical mockup 20 in the example is made of a light curable material, but may in other examples be made of a plastic material (for example molten from a plastic fiber), metal, gypsum, cement or other chemically hardenable materials.

Figure 5:
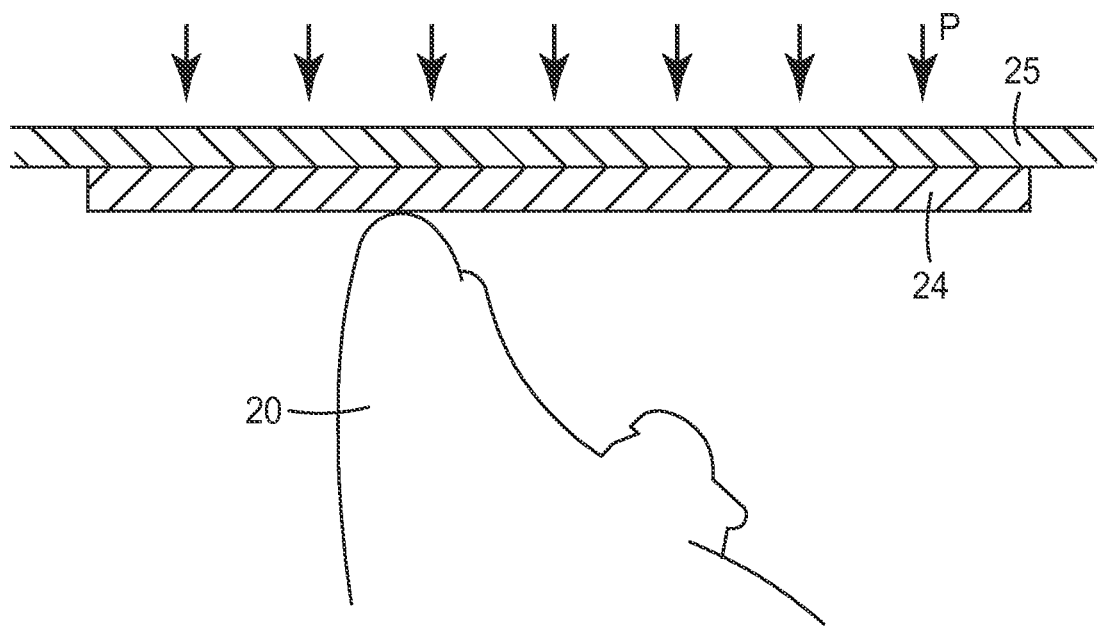

FIG. 5 shows the physical mockup 20 with an elastic sheeting 24 and a plastic sheeting 25. The elastic sheeting 24 is placed on top of the occlusal side of the teeth represented by the physical mockup 20, and on top of the elastic sheeting 24 a plastic sheeting is arranged. The elastic sheeting with the plastic sheeting are deformed, preferably by an air pressure P applied on the elastic and plastic sheeting 24, 25 in directions toward the physical mockup 20. This may be achieved by a vacuum generated beneath the elastic and plastic sheeting 24, 25 or a pressure above the elastic and plastic sheeting 24, 25. At least the plastic sheeting 25 may be heated before and/or during the deformation. As a result the elastic and plastic sheeting 24, 25 are deformed as illustrated in FIG. 6.

Figure 6:
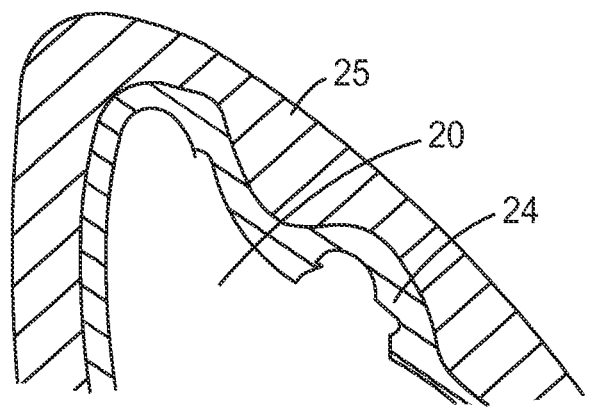

FIG. 6 shows the physical mockup 20 embraced by the elastic sheeting 24 and the plastic sheeting 25. The plastic sheeting 25 is preferably a clear thermoplastic film which conforms to the outer surface of the elastic sheeting 24. The plastic sheeting 25 is preferably allowed to solidify by cooling so as to provide it with a sufficient rigidity for handling. As illustrated the elastic sheeting 24 spaces the plastic sheeting 25 from the physical mockup 20.

In another example (not shown) instead of an elastic sheeting a space coat may be used. Such a space coat may be obtained from applying a solidifyable liquid or pasty material over the physical mockup 20, and allowing the material to solidify. This may be performed by dip coating, or manual coating using a dispensing syringe or brush. In the solidified state the coating material is preferably elastic or brittle such that it can be removed from the physical mockup at later stage. A plastic sheeting may be deformed over the coated mockup as described above.

In still a further example a space coat may be applied in an additive manufacturing machine along with the build-up of the physical model. In such a build-up process a relatively hard and a relatively soft material may be printed in three dimensions, with the hard material forming the physical mockup and the soft material forming the space coat. The soft material may be a so-called support material, which is typically used for layer-wise vertical printing of vertically spaced structures and removed after printing. An additive manufacturing machine which provides for such a printing process is for example available under the designation Projet™ Series from the company 3D systems, USA.

Figure 7:
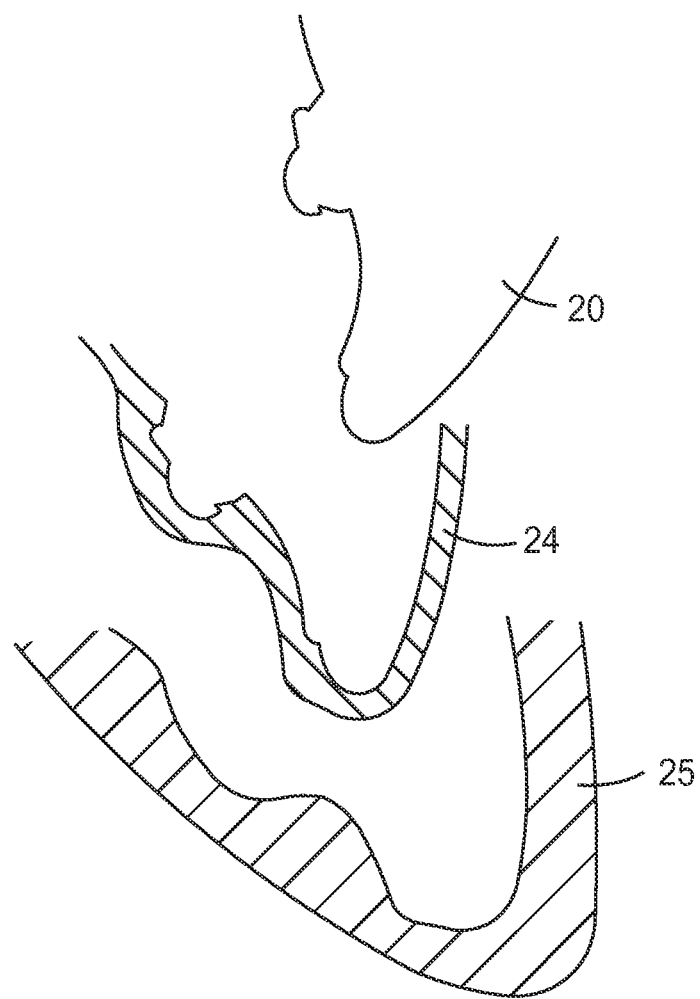

FIG. 7 illustrates a separation of the elastic sheeting 24 from the physical mockup 20 and the plastic sheeting 25. The elastic sheeting 24 may be disposed and the physical mockup 20 and the plastic sheeting 25 may be used to form the transfer tray for brackets as described in the following.

Figure 8:
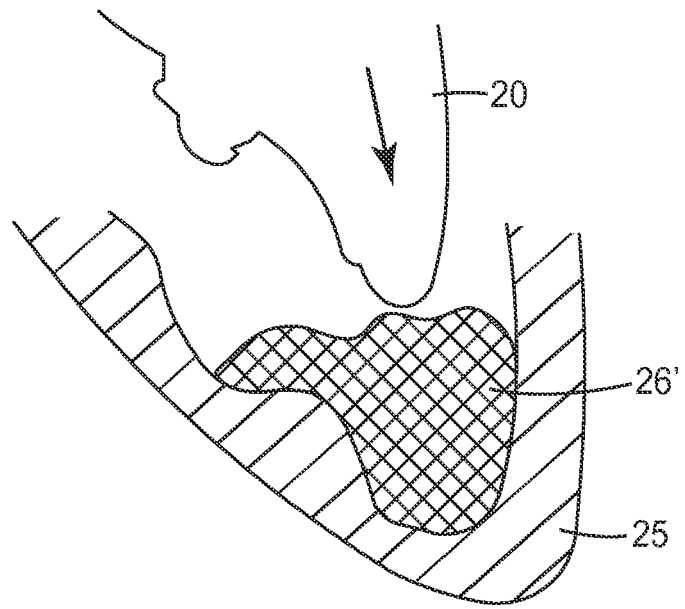
Figure 9:
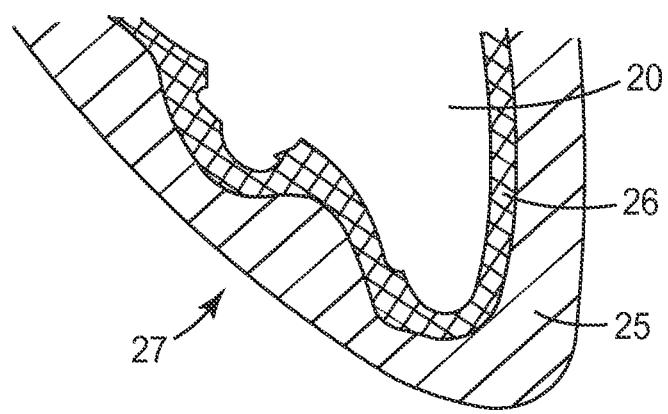

FIG. 8 shows the plastic sheeting 25 which has a cavity formed into the plastic sheeting 25 by use of the coated physical mockup as described above. A preferably clear solidifyable material 26' is received within the cavity of the plastic sheeting 25. The physical mockup 20 is mated with the plastic sheeting 25 and thereby dipped into the solidifyable material 26' which thereby preferably distributes between the outer surface of the physical mockup and the inner surface of the cavity as shown in FIG. 9. Optionally the combined physical mockup 20, the solidifyable material 26' and the plastic sheeting 25 are exposed to an overpressure relative to the normal atmospheric pressure to minimize voids or bubbles in the solidifyable material 26', in particular between the outer surface of the physical mockup 20 and the inner surface of the solidifyable material 26'. The solidifyable material 26' is allowed to solidify to provide a positioning layer 26 for the brackets. The positioning layer 26 in combination with the plastic sheeting 25 forms the transfer tray 27. The positioning layer 26 is preferably adapted such that it can position and retain the bracket and further such that it is deformable for receiving brackets therein and removing brackets therefrom. Accordingly the positioning layer 26 may be made of a relatively elastic and soft material (when solidified). Therefore the transfer tray 27 comprises the plastic sheeting 25 which preferably provides the tray with the required mechanical stiffness and stability, and the positioning layer 26 which preferably provides the transfer tray with receptacles in which the bracket can be precisely and removably retained. The positioning layer 26 approximately corresponds in shape with the shape of the elastic sheeting described above, however preferably is made of a different material.

Figure 10:
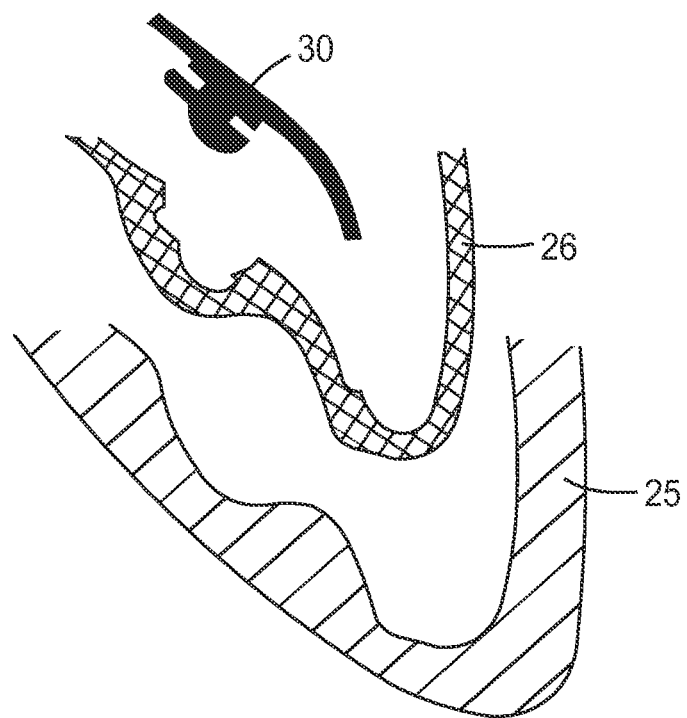
Figure 11:
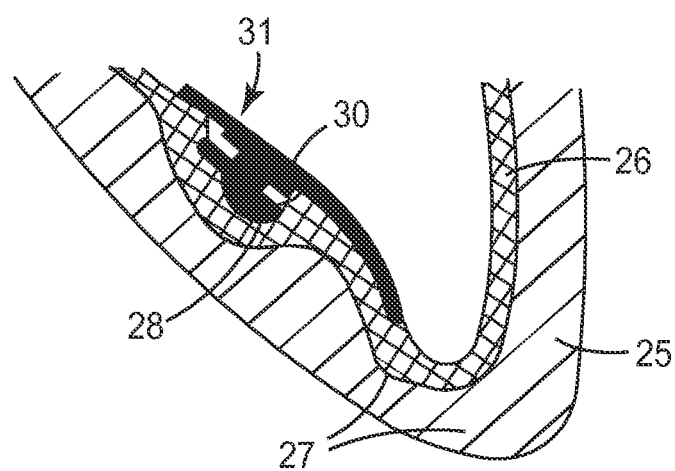

The positioning layer 26 and the plastic sheeting 25 may be trimmed in size to match with only a part of a patient's dental arch or to make the tray fit conveniently in a patient's mouth. For use of the transfer tray 27 as illustrated in FIG. 10 brackets (represented by bracket 30) are placed in associated receptacles in the positioning layer 26. Further the positioning layer 26 and the plastic sheeting are mated. The combined transfer tray 27 including the bracket 30 placed in the positioning layer 26 as shown in FIG. 11. An adhesive may be applied to the pad surface 31 of the bracket (and further brackets present in the tray) and the transfer tray may be placed on the teeth in a patient's mouth where the adhesive is caused or allowed to harden to establish a bond between the brackets in the tray and the patient's teeth. Once the bond is established the plastic sheeting 25 may be removed with leaving the positioning layer 26 in place on the patient's teeth. The positioning layer 26 due to its elastic properties and no longer supported by the plastic sheeting 25 thus can be easily peeled off from the patient's teeth and the brackets bonded thereon. As shown in the Figure spaces between the positioning layer 26 and the bracket 30 are present in undercut areas of the bracket 30, thus facilitating the separation between the positioning layer 26 and the bracket 30. Accordingly forces on the brackets bonded to the patent's teeth, and thereby the risk of breaking or affecting the bonds during removal of the transfer tray are minimized.

Due to the use of clear materials for the positioning layer 26 and the plastic sheeting 25 proper placement of the transfer tray 27 on a patient's teeth is facilitated. Further the clear material allows for visually determining a proper positioning of the brackets within the transfer tray.

The invention claimed is:

1. A method of making a physical mockup representing a shape composed of the positive shape of a patient's dental arch and the positive shape of a set of analogs, the method comprising the steps of:
   providing a virtual dental arch replicating at least part of the patient's dental arch;
   providing a virtual set of orthodontic brackets for the virtual dental arch;
   providing a virtual set of analogs, each virtual analog of the virtual set of analogs being associated with a virtual bracket of the virtual set of brackets, wherein one or more of the virtual analogs approximate the shapes of their associated virtual brackets;
   modifying the shape of at least one virtual bracket to form at least one of the virtual analogs by reducing or eliminating in the one virtual analog an undercut formed by the one virtual bracket;
   providing a virtual mockup in which the virtual dental arch and the set of virtual analogs are merged; and
   manufacturing the physical mockup based on the virtual mockup.

2. The method of claim 1, further comprising the step of positioning the virtual brackets relative to the virtual dental arch.

3. The method of claim 1, wherein the modifying step comprises increasing a three-dimensional volume represented by the virtual bracket by selectively modifying only a portion of the virtual bracket.

4. The method of claim 1, wherein the modifying step comprises reducing a three-dimensional volume represented by the virtual bracket by selectively modifying only a portion of the virtual bracket.

5. The method of claim 1, wherein the physical mockup is manufactured by additive manufacturing.

6. The method of claim 1, further comprising the step of providing a transfer tray for the set of virtual brackets through physically replicating the negative shape of at least part of the physical mockup.

7. The method of claim 6, comprising the steps of:
providing an elastic sheeting on the physical mockup to cover at least part of the tooth side of the mockup by the sheeting;
providing a plastic sheeting on the mockup with the elastic sheeting arranged between the plastic sheeting and the mockup;
deforming the plastic sheeting over the mockup such that it tightly encloses at least the tooth side of the mockup with the elastic sheeting embraced between the plastic sheeting and the mockup;
replacing the elastic sheeting by a hardenable liquid or pasty material; and
allowing the hardenable material to harden.

8. The method of claim 7, wherein the hardenable material is selected from among a rubber material, silicone material, alginate material and a dental impression material.

9. The method of claim 6, wherein the transfer tray replicates the negative shape of only part of the physical mockup.

10. The method of claim 6, further comprising the step of placing one or more physical brackets in respective one or more receptacles, wherein each receptacle corresponds to the negative shape of a virtual analog associated with the physical bracket.

* * * * *